Dec. 21, 1965 G. FÖRSTER 3,224,829

MOVING PICTURE AND TELEVISION CAMERA CONTROL APPARATUS

Filed Sept. 5, 1961 2 Sheets-Sheet 1

Inventor:
Gero Förster
by
Michael S. Striker
Attorney

Inventor:
Gero Förster
by Michael S. Striker
Attorney

United States Patent Office 3,224,829
Patented Dec. 21, 1965

3,224,829
MOVING PICTURE AND TELEVISION CAMERA CONTROL APPARATUS

Gero Förster, Darmstadt-Eberstadt, Germany, assignor to Fernseh G.m.b.H., Darmstadt, Germany Filed Sept. 5, 1961, Ser. No. 136,046
Claims priority, application Germany, Sept. 7, 1960, F 32,063; Sept. 20, 1960, F 32,156
7 Claims. (Cl. 352—131)

Figure 1:
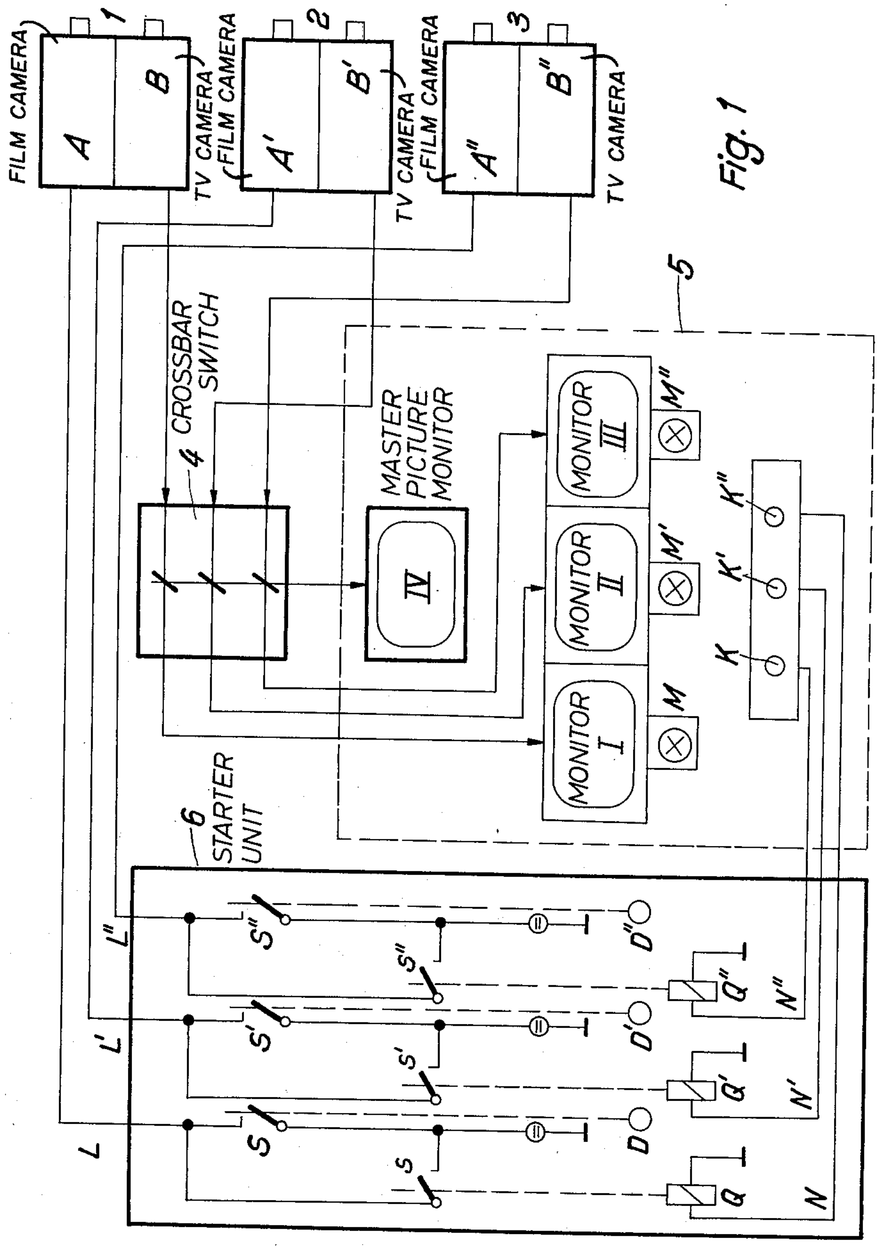

The present invention relates to moving picture and television camera control apparatus, in which each of a plurality of remotely controllable moving picture cameras has associated with it a television camera with the same field of view. The television signals from the individual television cameras are led to a control position from which the starting and stopping of the moving picture cameras may be remotely controlled. Thus at this control position the video signals from any of the television cameras may, by the operation of appropriate selector means, be made visible on the screen of a picture monitor as the corresponding moving picture cameras are taken into use.

In a known method of operating combined moving picture and television camera apparatus of this type a particular scene is first rehearsed and the individual shots of this scene are watched on the screens of picture monitors associated with each individual television camera. By the actuation of pushbuttons the picture which appears upon one of these screens is also made to appear on the screen of a master monitor, on which the individual shots are run through in that sequence which would be seen in the completed film if the individual shots were to be simultaneously photographed by the associated moving picture cameras. During this rehearsal an exact timing schedule is determined, from which it may be seen when and for how long each individual camera should shoot the scene.

With the aid of this timing schedule a shooting plan is worked out, which shows exactly when each of the moving picture cameras must be started and stopped, taking into accounting that each of the moving picture cameras requires a certain time for starting. When the final action takes place the moving picture cameras are started and stopped in accordance with the predetermined shooting plan and the video signals from the usually continuously operative television cameras are made visible on the master monitor in accordance with the predetermined timing schedule, while at the same time optical markers are produced on the exposed film which, when later on the film is cut, are indicative of each position at which a cut is to be effected.

If, in carrying out this known process, one of the cameras which is running is erroneously switched off before its proper time, then although this fact is indicated at the control position by the extinction of the corresponding pilot lamp, the filmed shot is incomplete and must therefore be repeated.

It is an object of the present invention to provide an apparatus by the use of which the necessity for such repetitions, which in some circumstances may be very costly, may be avoided.

It is a further object of the present invention to provide an apparatus which entirely prevents an accidental or erroneous premature switching-off of any moving picture camera. A combined moving picture and television camera control apparatus according to the present invention comprises a plurality of moving picture cameras, each of which has associated therewith a television camera arranged to have the same field of view as that of said moving picture camera. Selectively operable switch means are provided whereby signals from any one of said television cameras may be applied to control the display on the screen of a master picture monitor. Control means is provided for switching the moving picture cameras on and off. Further control means operates simultaneously with said switch means for preventing the switching off of that moving picture camera associated with the television camera of which the signals are at any time selected for display on said master picture monitor.

The apparatus according to the invention possesses the advantage that only a quite negligible additional expense is necessary.

The arrangement employed is conveniently such that on the actuation of one of a plurality of push-buttons the picture originating in one of the television cameras is made visible on the master picture monitor and at the same time a delay control relay is operated which prevents the accidental switching off of that moving picture camera associated with the selected television camera.

It is convenient to effect the switching on and off of the moving picture cameras by the use of switch means controlled by push-buttons, and to arrange in parallel with each switch means a relay contact which bridges the switch when the relay is operated. The operating coil of the relay is arranged to be supplied with current whenever the pushbutton used to select the picture from the associated television camera for display on the master picture monitor is pressed.

Further objects and advantages of the invention will become apparent to those skilled in the art from the following specification, when taken in conjunction with the accompanying drawings in which an embodiment of the invention is illustrated by way of example. It is to be expressly understood, however, that the drawings are for the purpose of illustration and description only, and are not intended as a definition of the limits of the invention. In the drawings, like reference numerals have been utilized to desigate like parts throughout.

Figure 2:
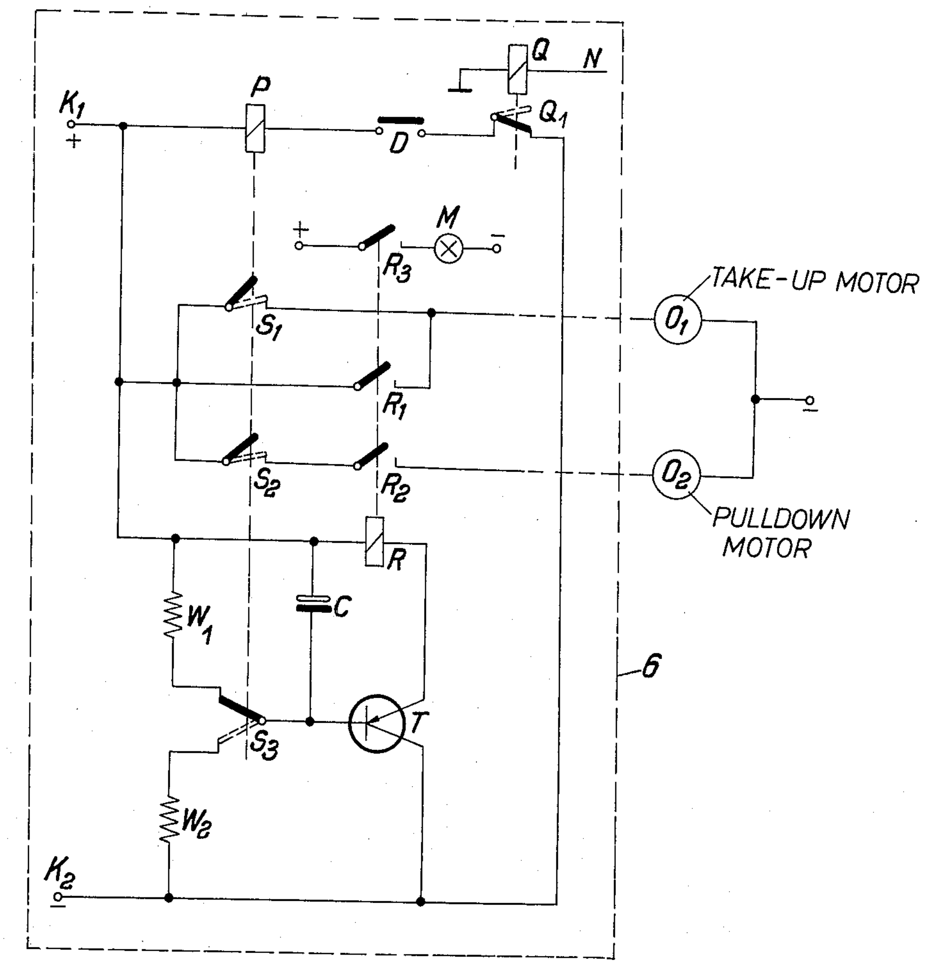

FIGURE 1 is a block schematic diagram of an embodiment of a moving picture and television camera control apparatus of the present invention; and FIGURE 2 shows a circuit arrangement suitable for use in the apparatus described in relation to FIGURE 1 for producing the correct switching sequence for the two motors controlling respectively the film pulldown mechanism and the film takeup spool of a moving picture camera.

In FIGURE 1 three combined moving picture and television cameras 1, 2 and 3 are assumed to be shooting a scene which is not indicated. Each of cameras 1, 2, and 3 consists of a moving picture camera A, A′, A″, respectively, and a television camera B, B′, B″, respectively, which is mechanically combined with the moving picture camera to form a unitary structure and which is arranged to shoot the same scene. The video signals from the three television cameras are fed by way of a crossbar switch 4 to individual picture monitors I, II and III, respectively, which display the scenes being shot by the television cameras and thus by the associated moving picture cameras. By actuating pressbuttons or switches K, K′, K″, arranged at the control position any one of these video signals can be made visible on the screen of the master picture monitor IV.

The moving picture cameras A, A′, A″, are connected by way of control cables L, L′, L″, respectively, with a starter unit 6 and may be switched on by actuation of the pushbuttons or control switches D, D′, D″, respectively, which are arranged to close corresponding switch contacts S, S′, S″. In the condition shown in the drawing none of the moving picture cameras A, A′, A″, is switched on.

According to a known technique of film production a particular scene is first rehearsed and the individual shots are observed on the screens of the camera monitors I, II, III. One of these pictures is selected at any time and by pressing the appropriate button or switch K, K′, or K″ is made visible on the screen of the master picture monitor IV, so that the individual shots of the scene appear there in that sequence which would be obtained in the complete film if the scene were simultaneously shot by the corresponding moving picture cameras. From this rehearsal an accurate timing schedule is laid down, from which it may be seen when and for how long the individual cameras must shoot the scene.

For use at the starter unit 6 there is prepared by the use of this timing schedule a shooting plan in which allowance is made for the fact that a moving picture camera must be switched on a certain time (some two seconds) before the film at which it is to contribute to the completed film.

From the shooting plan thus prepared it may be seen when each of the moving picture cameras must be switched on and off. It may thus occur that more than one of the moving picture cameras must be run at the same time, especially for example when in the course of a scene cuts are made rapidly from one camera to another.

During the actual shooting of the scene the moving picture cameras are switched on and off in accordance with the predetermined shooting plan and at the control position 5 the video signal of one of the television cameras is displayed on the screen of the master picture monitor IV in accordance with the predetermined time schedule. When any of the pushbuttons or switches K, K′, K″ which select a camera picture for display is pressed, there is at the same time optically produced on the film in the associated motion picture camera a mark which, when the film later comes to be cut, indicates the position at which a cut is to be made. This mark may be produced by the optical expedient of using a contact controlled by the pushbutton to cause a flashlamp to be flashed to excite a portion of the film in the camera. The moving picture cameras A, A′, A″ which at any time are actually running are indicated at the control position by pilot lamps M, M′, M″, which light when the associated or related camera is running. Supervision of the shooting of the film is thus possible inasmuch as during the appearance of the picture from a particular television camera on the screen of the master picture monitor IV the pilot lamp corresponding to the moving picture camera associated with that television camera must also be alight. If, however, the camera running at the time is accidentally switched off prematurely, then it is true that this fact is visible at the control position, but the filmed shot of the scene is unusable and must be repeated. The purpose of the invention is to provide an appartaus by the operation of which repetitions of this kind, which may sometimes be very costly, may be avoided. For this purpose, in apparatus according to one embodiment of the invention, the switches S, S′, S″ in the control leads L, L′, L″ are bridged by additional contacts *s*, *s*′, *s*″, the operation of which is controlled by relays Q, Q′, Q″ which in turn are energized whenever the corresponding pushbuttons K, K′ or K″ are preseed to select a television picture. Thus during the period when the picture from any television camera B, B′, B″ is selected for display on the master picture monitor IV the associated moving picture camera A, A′, A″ cannot be switched off. If, for example, the moving picture camera A″ is switched on at a particular time and the video signal of the associated television camera B″ is displayed on the screens of the monitors III and IV, then the contact *s*″ of relay Q″ bridges contact S″ of pushbutton or control switch D″, so that moving picture camera A″ cannot be switched off.

It has been assumed in describing the apparatus of FIG. 1 that a moving picture camera requires a single supply lead from a source of electrical energy to be switched in order to turn the camera on and off. In practice, a moving picture camera usually includes a takeup spool, a takeup motor coupled to the takeup spool and adapted to be operated by electrical energy to drive said takeup spool, a film-advancing sprocket and a pulldown motor coupled to said film-advancing sprocket and adapted to be operated by electrical energy to drive said film-advancing sprocket. The takeup motor thus serves to drive the takeup spool, while the pulldown motor drives the sprocket which advances the film in the region of the film gate. Thus, to switch on the moving picture camera the takeup motor should first be operated or switched on and then, after a predetermined delay, the pulldown motor should be switched on or operated. The switching on of the pulldown motor must be effected after a certain delay in order to keep the film under tension when switching on. On switching off the moving picture camera the pulldown motor must be switched off first and the takeup motor switched off only after a certain delay period has elapsed, in order to keep the film under tension when switching off.

FIGURE 2 shows a circuit arrangement for switching on and off the film takeup motor $O_1$ and the film pulldown motor $O_2$ of the moving picture camera A of FIGURE 1. Similar circuit arrangements would also be provided to control the operation of the take-up and pulldown motors of the other moving picture cameras A′ and A″. On pressing the pushbutton D, current is briefly supplied to the energizing winding or operating coil of pulse-operated relay P from a source of electrical energy represented by terminals $K_1$ and $K_2$, by way of a normally-closed contact $Q_1$, the purpose of which is described later. The pulse-operated relay P is a current-pulse relay, which responds to the receipt of one pulse of current by closing its contacts and to the next pulse of current by opening them. When the pulse-operated relay P operates as pushbutton or control switch D is pressed the switch contacts $S_1$, $S_2$ and $S_3$ of the pulse-operated relay P are all moved from the positions shown in solid lines to those shown in broken lines. A first switch contact $S_1$ of the switch arrangement comprising the pulse-operated relay P, including the switch control energizing winding of said relay and the switch contacts of said relay, connects the film takeup motor $O_1$ to terminal $K_1$ of the direct-current source.

A third switch contact $S_2$ of relay P of the switch arrangement prepares an operating path for the film pulldown motor $O_2$ by way of a normally-open second switch contact $R_2$ of a delay control relay R. A second switch contact $S_3$ of the switch arrangement allows a previously discharged capacitor C to charge negatively by way of a resistor $W_2$ which is connected between the second switch contact $S_3$ and the negative terminal $K_2$ of the source of electrical energy. Capacitor C is connected to the base of a transistor T, the potential applied to which thus moves negatively until after a predetermined interval, the length of which is controlled by the time-constant of capacitor C and resistor $W_2$, the emitter-collector path of transistor T becomes conductive and current from the source of electrical energy is allowed to flow through the energizing winding or operating coil of the delay control relay R, which then operates. When this happens the second switch contact $R_2$ of the delay control relay R closes to complete the operating circuit for the pulldown motor $O_2$, while the first switch contact $R_1$ of said delay control relay bridges the first switch contact $S_1$ of relay P and thus prepares for delayed switching off of the take-up motor $O_1$. The third switch contact $R_3$ of the delay control relay R is used to switch on a pilot lamp M.

When pushbutton D is again pressed another pulse of current is applied to the pulse-operated relay P, so that the contacts of this relay now open to the positions shown in solid lines. The third switch contact $S_2$ of the switch arrangement then opens the operating circuit for the pulldown motor $O_2$ of the moving picture camera and the second switch contact $S_3$ of said switch arrangement breaks the circuit for the pilot lamp, while the first switch contact $S_1$ opens, but the operating circuit for the takeup motor $O_1$ is still completed by way of the first switch contact $R_1$ of the delay control relay R. The second contact $S_3$ of the pulse-operated relay P then connects the base of transistor T, and the capacitor C which is connected to it, by way of a resistor $W_1$ to the positive terminal $K_1$ of the source of electrical energy so that the base of the transistor slowly becomes more positive until finally, after a predetermined time-interval, the emitter-collector path of the transistor is cut off and the delay control relay R is caused to release. The supply to the film takeup motor $O_1$ is then broken by the first switch contact $R_1$, of the delay control relay R, while the second switch contact $R_2$ of the delay control relay R opens to prevent the supply of electrical energy to the pulldown motor $O_2$ from being restored immediately. The third switch contact $S_2$ of the switch arrangement next closes and the third switch contact $R_3$ of the delay control relay R breaks the circuit for the pilot lamp.

In the circuit arrangement of FIGURE 2, the pulse-operated relay P is supplied with current when the pushbutton D or control switch is pressed by way of a break contact $Q_1$ of relay Q. The relay Q is arranged to operate whenever the pushbutton or switch K at the control position is operated to select the picture from television camera B for display on the master picture monitor IV. In the normal course of operation, when this selection is made the moving picture camera A associated with television camera B will already have been started, so that the energization of the relay Q and the consequent opening of the relay contact $Q_1$ will prevent the further actuation of the pulse-operated relay P and the moving picture camera A will continue to run until the operating circuit for said pulse-operated relay P is restored by the closing of contact $Q_1$. This cannot occur until the pushbutton K is released by the selection of another picture for display on the master picture monitor.

This arrangement ensuress that, in accordance with the present invention, it is impossible to switch off a moving picture camera which is running at any time during which its picture has been selected for display on the master picture monitor IV.

What is claimed as new and desired to be secured by Letters Patent is:

1. Apparatus comprising, in combination, a plurality of moving picture cameras; a plurality of television cameras each associated with a corresponding one of said moving picture cameras and having the same field of view as the associated moving picture camera; master television picture monitor means; switch means interconnected between said moving picture and televsion cameras and said master televsion picture monitor means, said switch means being selectively operable to connect one of said television cameras to said master television picture monitor means; a plurality of first control means each connected to a corresponding one of said moving picture cameras for operating the said moving picture camera independently of the other moving picture cameras and independently of operation of said switch means; and second control means cooperating with said switch means to operate that moving picture camera which is associated with that television camera which is connected by said switch means to said master television picture monitor independently of operation of any of said moving picture cameras by any of said first control means.

2. Apparatus comprising, in combination, a plurality of moving picture cameras each having a film driving motor adapted to be operated by electrical energy; a plurality of television cameras each associated with a corresponding one of said moving picture cameras and having the same field of view as the associated moving picture camera; master television picture monitor means; switch means interconnected between said moving picture and television cameras and said master television picture monitor means, said switch means being selectively operable to connect one of said television cameras to said master television picture monitor means; a plurality of first control means each connected to a corresponding one of said moving picture cameras for operating the said moving picture camera independently of the other moving picture cameras and independently of operation of said switch means; and second control means cooperating with said switch means to operate that moving picture camera which is associated with that television camera which is connected by said switch means to said master television picture monitor independently of operation of any of said moving picture cameras by any of said first control means; said second control means comprising a plurality of relays each associated with a corresponding one of said moving picture cameras, each of said relays having an energizing winding and a switch contact positioned in operative proximity with said energizing winding, said energizing winding being adapted to position said switch contact in one of an open condition and a closed condition, a source of electrical energy, conductive means connecting the switch contact of each of said relays between the film driving motor of its associated moving picture camera and said source of electrical energy, and further conductive means connecting the energizing windings of said relays to said switch means in a manner whereby operation of the said switch means operates the energizing winding of an associated relay to position the switch contact of the associated relay in its closed condition thereby conductively connecting the film driving motor of the moving picture camera associated with the selected one of said television cameras to said source of electrical energy.

3. Apparatus comprising, in combination, a plurality of moving picture cameras each having a film driving motor adapted to be operated by electrical energy; a plurality of television cameras each associated with a corresponding one of said moving picture cameras and having the same field of view as the associated moving pitcure camera; master television picture monitor means; switch means interconnected between said moving picture and television cameras and said master television picture monitor means, said switch means being selectively operable to connect one of said television cameras to said master television picture monitor means; a plurality of first control means each connected to a corresponding one of said moving picture cameras for operating the said moving picture camera independently of the other moving picture cameras and independently of operation of said switch means, each of said plurality of first control means including a control switch associated with a corresponding one of said moving picture cameras; and second control means cooperating with said switch means to operate that moving picture camera which is associated with that television camera which is connected by said switch means to said master television picture monitor independently of operation of any of said moving picture cameras by any of said first control means, said second control means comprising a plurality of pulse-operated relays each associated with a corresponding one of said moving picture cameras and a corresponding one of the control switches of said plurality of first control means, each of said pulse-operated relays having an energizing winding and a plurality of switch contacts positioned in operative proximity with said energizing winding, said energizing winding being adapted to position said switch contacts in one of a first condition and a second condition, a plurality of relays each associated with a corresponding one of said moving picture cameras, each of said relays having an energizing winding and a switch contact positioned in operative proximity with said energizing winding, said energizing winding being adapted to position said switch contact in one of an open condition and a closed condition, a source of electrical energy, and conductive means connecting the energizing winding of each of said pulse-operated relays in series circuit arrangement with said source of electrical energy, an associated control switch of said control means and the switch contact of the associated relay.

4. Apparatus comprising, in combination, a plurality of moving picture cameras for recording a succession of images on film in each of said cameras, each of said cameras having a takeup spool, a takeup motor coupled to said takeup spool and adapted to be operated by electrical energy to drive said takeup spool, a film-advancing sprocket and a pulldown motor coupled to said film-advancing sprocket and adapted to be operated by electrical energy to drive said film-advancing sprocket; a plurality of television cameras each associated with a corresponding one of said moving picture cameras and having the same field of view as the associated moving picture camera; master television picture monitor means; switch means interconnected between said moving picture and television cameras and said master television picture monitor means, said switch means being selectively operable to connect one of said television cameras to said master television picture monitor means; a source of electrical energy; a plurality of first control means each connected between said source of electrical energy and each a corresponding one of said moving picture cameras for connecting the takeup motors of said moving picture camera independently of the other moving picture cameras and independently of operation of said switch means to said source of electrical energy and for connecting the pulldown motor of said moving picture camera independently of the other moving picture cameras and independently of operation of said switch means to said source of electrical energy a predetermined period of time after the connection of said takeup motor to said source of electrical energy; and second control means cooperating with said switch means to operate that moving picture camera which is associated with that television camera which is connected by said switch means to said master television picture monitor independently of operation of any of said moving picture cameras by any of said first control means.

5. Apparatus comprising, in combination, a plurality of moving picture cameras for recording a succession of images on film in each of said cameras, each of said cameras having a takeup spool, a takeup motor coupled to said takeup spool and adapted to be operated by electrical energy to drive said takeup spool, a film-advancing sprocket and a pulldown motor coupled to said film-advancing sprocket and adapted to be operated by electrical energy to drive said film-advancing sprocket; a plurality of television cameras each associated with a corresponding one of said moving picture cameras and having the same field of view as the associated moving picture camera; master television picture monitor means; switch means interconnected between said moving picture and television cameras and said master television picture monitor means, said switch means being selectively operable to connect one of said television cameras to said master television picture monitor means; a source of electrical energy; a plurality of first control means each connected between said source of electrical energy and a corresponding one of said moving picture cameras for connecting the takeup motor of said moving picture camera independently of the other moving picture cameras and independently of operation of said switch means to said source of electrical energy and for connecting the pulldown motor of said moving picture camera independently of the other moving picture cameras and independently of operation of said switch means to said source of electrical energy a predetermined period of time after the connection of said takeup motor to said source of electrical energy; said plurality of first control means comprising delay means including a first switch contact, a second switch contact and delay control means positioned in operative proximity with said first and second switch contacts and adapted to position each of said first and second switch contacts in one of a closed condition and an open condition a predetermined period of time after operation of said switch means, a switch arrangement having a plurality of switch contacts each adapted to be positioned in one of a first condition and a second condition, first conductive means connecting a first of the switch contacts of said switch arrangement between said source of electrical energy and the takeup motor of one of said moving picture cameras, second conductive means connecting a second of the switch contacts of said switch arrangement between said source of electrical energy and said delay means, third conductive means connecting a third of the switch contacts of said switch arrangement between said source of electrical energy and the pulldown motor of one of said moving picture cameras through the first switch contact of said delay means, and fourth conductive means connecting the second switch contact of said delay means across the first of the switch contacts of said switch arrangement; second control means cooperating with said switch means to operate that moving picture camera which is associated with that television camera which is connected by said switch means to said master television picture monitor independently of operation of any of said moving picture cameras by any of said first control means.

6. Apparatus comprising, in combination, a plurality of moving picture cameras for recording a succession of images on film in each of said cameras, each of said cameras having a takeup spool, a takeup motor coupled to said takeup spool adapted to be operated by electrical energy to drive said takeup spool, a film-advancing sprocket and a pulldown motor coupled to said film-advancing sprocket and adapted to be operated by electrical energy to drive said film-advancing sprocket; a plurality of television cameras each associated with a corresponding one of said moving picture cameras and having the same field of view as the associated moving picture camera; master television picture monitor means; switch means interconnected between said moving picture and television cameras and said master television picture monitor means, said switch means being selectively operable to connect one of said television cameras to said master television picture monitor means; a source of electrical energy; a plurality of first control means each connected between said source of electrical energy and a corresponding one of said moving picture cameras for connecting the takeup motor of said moving picture camera independently of the other moving picture cameras and independently of operation of said switch means to said source of electrical energy and for connecting the pulldown motor of said moving picture camera independently of the other moving picture cameras and independently of operation of said swicth means to said source of electrical energy a predetermined period of time after the connection of said takeup motor to said source of electrical energy; said plurality of first control means comprising delay means including a first switch contact, a second switch contact and delay control means positioned in operative proximity with said first and second switch contacts and adapted to position each of said first and second switch contacts in one of a closed condition and an open condition a predetermined period of time after operation of said switch means, a switch arrangement having a plurality of switch contacts each adapted to be positioned in one of a first condition and a second condition and switch control means positioned in operative proximity with said first, second and third of the switch contacts of said switch arrangements, first conductive means connecting a first of the switch contacts of said switch arrangement between said soure of electrical energy and the takeup motor of one of said moving picture cameras, second conductive means connecting a second of the switch contacts of said switch arrangement between said source of electrical energy and said delay means, third conductive means connecting a third of the switch contacts of said switch arrangement between said source of electrical energy and the pulldown motor of one of said moving picture cameras through the first switch contact of said delay means, the switch control means of said switch arrangement being adapted to position said first switch contact of said switch arrangement in its first condition in which the connection between said source of electrical energy and said takeup motor is opened, to position said second switch contact of said switch arrangement in its first condition in which said delay means is connected to one of the terminals of said source of electrical energy and to position said third switch contact of said switch arrangement in its first condition in which the connection between said source of electrical energy and said pulldown motor is opened, and fourth conductive means connecting the second switch contact of said delay means across the first of the switch contacts of said switch arrangement; and second control means cooperating with said switch means to operate that moving picture camera which is associated with that television camera which is connected by said switch means to said master television picture monitor independently of operation of any of said moving picture cameras by any of said first control means.

7. Apparatus comprising, in combination, a plurality of moving picture cameras for recording a succession of images on film in each of said cameras, each of said cameras having a takeup spool, a takeup motor coupled to said takeup spool and adapted to be operated by electrical energy to drive said takeup spool, a film-advancing sprocket and a pulldown motor coupled to said film-advancing sprocket and adapted to be operated by electrical energy to drive said film-advancing sprocket; a plurality of television cameras each associated with a corresponding one of said moving picture cameras and having the same field of view as the associated moving picture camera; master picture monitor means; switch means interconnected between said moving picture and television cameras and said master picture monitor means, said switch means being selectively operable to connect one of said television cameras to said master picture monitor means; a source of electrical energy; control means connected between said source of electrical energy and each of said moving picture cameras for connecting the takeup motors of said moving picture cameras to said source of electrical energy and for connecting the pulldown motors of said moving picture cameras to said source of electrical energy a predetermined period of time after the connection of said takeup motors to said source of electrical energy; said control means comprising delay means comprising a transistor having emitter, collector and base electrodes, a capacitor, a delay control relay having an energizing winding and first and second switch contacts positioned in operative proximity with said energizing winding, said energizing winding being adapted to position each of said first and second switch contacts in one of a closed condition and an open condition, a switch arrangement having a plurality of switch contacts each adapted to be positioned in one of a first condition and a second condition and switch control means positioned in operative proximity with said first, second and third of the switch contacts of said switch arrangement and adapted to position said switch contacts in one of a first and second condition, first circuit means connecting a first of the switch contacts of said switch arrangement between said source of electrical energy and the takeup motor of one of said moving picture cameras, second circuit means connecting a second of the switch contacts of said switch arrangement between said source of electrical energy and said delay means, third circuit means connecting a third of the switch contacts of said switch arrangement between said source of electrical energy and the pulldown motor of one of said moving picture cameras through the first switch contact of said delay means, fourth circuit means connecting the second switch contact of said delay means across the first of the switch contacts of said switch arrangement, fifth circuit means connecting the base electrode of said transistor to the second switch contact of said switch arrangement, sixth circuit means connecting the base electrode of said transistor to one terminal of said source of electrical energy through said capacitor and seventh circuit means connecting one of the other electrodes of said transistor to said one terminal of said source of electrical energy through the energizing winding of said delay control relay; and further control means cooperating with said switch means to maintain operation of that moving picture camera which is associated with that television camera which is connected by said switch means to said master picture monitor.

References Cited by the Examiner

UNITED STATES PATENTS

| | | | |
|---|---|---|---|
| 2,690,472 | 9/1954 | Boucheron. | |
| 2,771,814 | 11/1956 | Isom | 88—17 |
| 2,928,311 | 3/1960 | Strauss | 88—16 |

LEO SMILOW, *Primary Examiner.*

WILLIAM MISIEK, *Examiner.*